United States Patent
Kosiak et al.

(10) Patent No.: US 11,667,330 B2
(45) Date of Patent: *Jun. 6, 2023

(54) EVASIVE STEERING ASSIST WITH A PRE-ACTIVE PHASE

(71) Applicant: Aptiv Technologies Limited, St. Michael (BB)

(72) Inventors: Walter K. Kosiak, Kokomo, IN (US); Guoguang Zhang, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,469

(22) Filed: Jun. 28, 2022

(65) Prior Publication Data
US 2022/0324513 A1     Oct. 13, 2022

Related U.S. Application Data

(63) Continuation of application No. 17/127,836, filed on Dec. 18, 2020, now Pat. No. 11,427,254.

(51) Int. Cl.
*B62D 15/02*    (2006.01)
*B62D 6/00*    (2006.01)
*B62D 5/00*    (2006.01)

(52) U.S. Cl.
CPC .......... *B62D 15/0265* (2013.01); *B62D 5/00* (2013.01); *B62D 6/00* (2013.01); *B62D 15/021* (2013.01); *B62D 15/029* (2013.01)

(58) Field of Classification Search
CPC ...... B62D 15/02; B62D 15/00; B62D 15/021; B62D 15/029; B62D 6/00
See application file for complete search history.

(56) References Cited

U.S. PATENT DOCUMENTS

| 5,913,375 A | 6/1999 | Nishikawa |
| 8,392,062 B2 * | 3/2013 | Oechsle ............. B60R 21/0134 340/435 |

(Continued)

FOREIGN PATENT DOCUMENTS

EP    3597510 A1    1/2020

OTHER PUBLICATIONS

"Extended European Search Report", EP Application No. 21204761.7, dated Apr. 12, 2022, 11 pages.

(Continued)

*Primary Examiner* — Tan Q Nguyen
(74) *Attorney, Agent, or Firm* — Sawtooth Patent Group PLLC

(57) ABSTRACT

Techniques and systems are described that enable evasive steering assist (ESA) with a pre-active phase. An ESA system predicts that a collision with an object is imminent and enters a pre-active phase. The pre-active phase causes a required drop in steering force to occur prior to determining that the collision is imminent. At a later time, the ESA system determines that the collision is imminent and enacts an active phase. The active phase causes a steering force effective to avoid the collision. By enacting the pre-active phase prior to the determination of the imminent collision, the ESA system may provide the additional steering force needed to avoid the collision without delay while simultaneously shielding a driver of vehicle from feeling the drop in steering force.

20 Claims, 6 Drawing Sheets

(56) References Cited

U.S. PATENT DOCUMENTS

| | | | |
|---|---|---|---|
| 2003/0220738 A1* | 11/2003 | Abe | G08G 1/166 |
| | | | 340/436 |
| 2005/0065688 A1* | 3/2005 | Rao | B60R 21/013 |
| | | | 340/436 |
| 2005/0203705 A1 | 9/2005 | Izumi et al. | |
| 2007/0291130 A1 | 12/2007 | Broggi et al. | |
| 2014/0012492 A1 | 1/2014 | Bowers et al. | |
| 2017/0008518 A1* | 1/2017 | Arndt | B60W 30/09 |
| 2019/0049981 A1* | 2/2019 | Fischer | G05D 1/0088 |
| 2019/0270452 A1 | 9/2019 | Katsura et al. | |
| 2019/0270453 A1 | 9/2019 | Katsura et al. | |
| 2020/0023900 A1* | 1/2020 | Jonasson | B62D 15/0265 |
| 2020/0130680 A1* | 4/2020 | Cho | B60W 30/09 |

OTHER PUBLICATIONS

"Foreign Office Action", EP Application No. 21204761.7, dated Nov. 30, 2022, 5 pages.

"Evasive Steering Assist", Retrieved from https://www.autovision-news.com/glossary/evasive-steering-assist/ on Mar. 30, 2023, 2 pages.

"Evasive Steering Assist", Retrieved from https://www.ford.com/technology/driver-assist-technology/evasive-steering-assist/ on Mar. 30, 2023, 7 pages.

\* cited by examiner

EVASIVE STEERING ASSIST WITH A PRE-ACTIVE PHASE

CROSS-REFERENCE TO RELATED APPLICATION

This application is a continuation of U.S. patent application Ser. No. 17/127,836, filed Dec. 18, 2020, the entire disclosure of which is hereby incorporated herein by reference.

BACKGROUND

Driver-assistance technologies are increasingly implemented in vehicles to increase safety. Evasive steering assist (ESA) is one driver-assistance technology that enables vehicles to automatically steer to avoid collisions with objects. For example, a vehicle may determine that a collision with an object is imminent and provide a steering force to the vehicle to avoid the object.

When activated, however, ESA systems will often necessitate a drop in steering force provided by the system prior to providing an additional steering force needed to avoid the object. This drop not only causes a delay in providing the additional steering force but may also be disconcerting for a driver of the vehicle (e.g., they may feel as though the power steering has failed).

SUMMARY

Aspects described below include a method of evasive steering assist (ESA) that is performed by a vehicle. The method comprises ascertaining, based on sensor data received from one or more sensors that are local to the vehicle, at least one of a state or an environment of the vehicle over time. The method also comprises predicting, based on the state or the environment of the vehicle at a first time, that a collision with an object is imminent, entering, based on the prediction that the collision with the object is imminent, a pre-active phase, and causing, during the pre-active phase, a power-steering system to adjust a steering force provided by the power-steering system. The method further comprises determining, based on the state or the environment of the vehicle at a second time, that the collision with the object is imminent, entering, based on the determination that the collision with the object is imminent, an active phase, and causing, during the active phase, the power-steering system to adjust the steering force effective to steer the vehicle to avoid the collision with the object.

Aspects described below also include a system for ESA of a vehicle. The system comprises one or more sensors configured to produce sensor data indicating at least one of a state of the vehicle over time or an environment of the vehicle over time. The system additionally comprises a power-steering system configured to provide a steering force to the vehicle. The system also comprises at least one processor and at least one computer-readable storage medium comprising instructions that, when executed by the processor, cause the system to predict, based on the state or the environment of the vehicle at a first time, that a collision with an object is imminent. The instructions further cause the system to enter, based on the prediction that the collision with the object is imminent, a pre-active phase and cause, during the pre-active phase, the power-steering system to adjust the steering force. The instructions also cause the system to determine, based on the state or the environment of the vehicle at a second time, that the collision with the object is imminent, enter, based on the determination that the collision with the object is imminent, an active phase; and cause, during the active phase, the power-steering system to adjust the steering force effective to steer the vehicle to avoid the collision with the object.

BRIEF DESCRIPTION OF THE DRAWINGS

Apparatuses and techniques enabling evasive steering assist (ESA) with a pre-active phase are described with reference to the following drawings. The same numbers are used throughout the drawings to reference like features and components.

DETAILED DESCRIPTION

Overview

Evasive steering assist (ESA) systems enable vehicles to determine that collisions with objects are imminent and provide steering forces in order to avoid the collisions. Often times, however, these systems (or portions thereof) require a drop in steering force provided by the systems when enacted. The drop in steering force causes delays in applying additional steering forces needed to avoid the collisions while simultaneously causing drivers a perception of loss of steering support.

Techniques and systems are described that enable ESA with a pre-active phase. An ESA system predicts that a collision with an object is imminent and enters a pre-active phase. The pre-active phase causes the required drop in steering force to occur prior to determining that the collision is imminent. At a later time, the ESA system determines that the collision is imminent and enacts an active phase. The active phase causes a steering force effective to avoid the collision. By enacting the pre-active phase prior to the determination of the imminent collision, the ESA system may provide the additional steering force needed to avoid the collision without delay while simultaneously shielding a driver of vehicle from feeling the drop in steering force.

Example Process Flow

Figure 1:
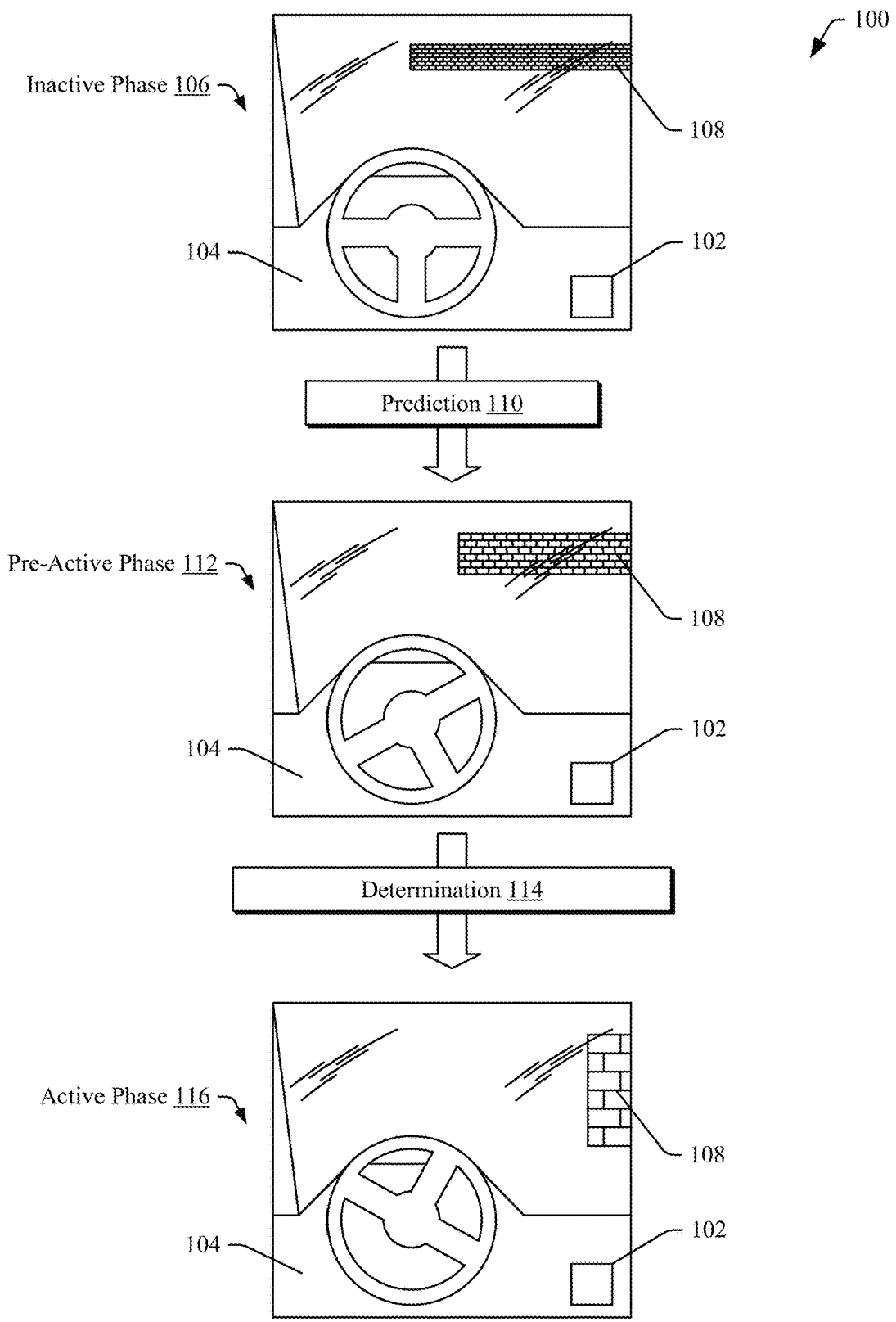
FIG. 1 illustrates an example process flow of ESA with a pre-active phase.

FIG. 1 is an example process flow 100 of ESA with a pre-active phase. The process flow 100 is generally implemented by an ESA system 102 of a vehicle 104, which is discussed further in regard to FIG. 5.

The process flow 100 starts with the ESA system 102 in an inactive phase 106. In the inactive phase 106, the ESA system 102 is inactive such that vehicle 104 is operating in a standard driving mode (e.g., standard power steering force). In the illustrated example, the vehicle 104 is an object 108. Although the ESA system 102 is considered to be inactive during the inactive phase 106, it may still monitor aspects of the vehicle and the environment of the vehicle.

As the vehicle 104 approaches the object 108, the ESA system 102, while in the inactive phase 106, predicts that a collision with the object 108 is imminent (prediction 110). The prediction 110 may be based on sensor data from one or more sensors of the vehicle 104. For example, the prediction 110 may be in response to the ESA system 102 detecting that a forward collision warning (FCW) is active. The prediction 110 may further be based on detecting that a driver input to a steering wheel of the vehicle 104 has surpassed a threshold (e.g., a rapid angular velocity or acceleration is detected). It should be noted that the prediction 110 would not cause a conventional ESA system to activate and/or provide additional steering forces.

Based on the prediction 110, the ESA system 102 enters a pre-active phase 112. The pre-active phase 112 causes a power-steering system of the vehicle to drop a steering force provided by the power-steering system and then ramp up to a pre-active steering force. The pre-active steering force may correspond to that of the inactive phase 106 (e.g., a standard power steering force) or may be slightly above that of the inactive phase 106. If the pre-active steering force is configured to be higher than that of the inactive phase 106, the additional steering force is generally not enough to be felt by the driver. For example, the additional steering force (on top of the standard power steering force) may correspond to less than five Newton-meters (Nm) at the steering wheel. It should be noted that conventional ESA systems do not include the pre-active phase 112 and, therefore, these other systems cause an associated power-steering system to drop the steering force after determining that a collision with an object 108 is imminent (determination 114).

As the vehicle 104 continues to approach the object 108, the ESA system 102 determines that the collision with the object 108 is imminent (determination 114) while in the pre-active phase 112. The determination 114 may be based on a distance to the object 108 and a steering angle of the vehicle (e.g., angle of the front wheels relative to the vehicle 104). For example, it may be determined that the vehicle 104 is turning, or has turned, the steering wheel an insufficient amount to avoid the object 108. In other words, the turning is not sufficient to avoid the object 108. As mentioned above, the determination 114 is when conventional ESA systems would activate, thus, causing the drop in steering force to occur after the determination 114.

Based on the determination 114, the ESA system 102 enters an active phase 116. The active phase 116 causes the power-steering system to apply a steering force effective to steer the vehicle 104 around the object 108. However, because the power-steering system of the vehicle is caused to drop the steering force prior to the active phase 116, e.g., during the pre-phase 112, the drop may not be felt by the driver. Furthermore, the additional steering forces needed to avoid the object 108 may be applied immediately after the determination 114.

Example Trajectory and Steering Forces

Figure 2:
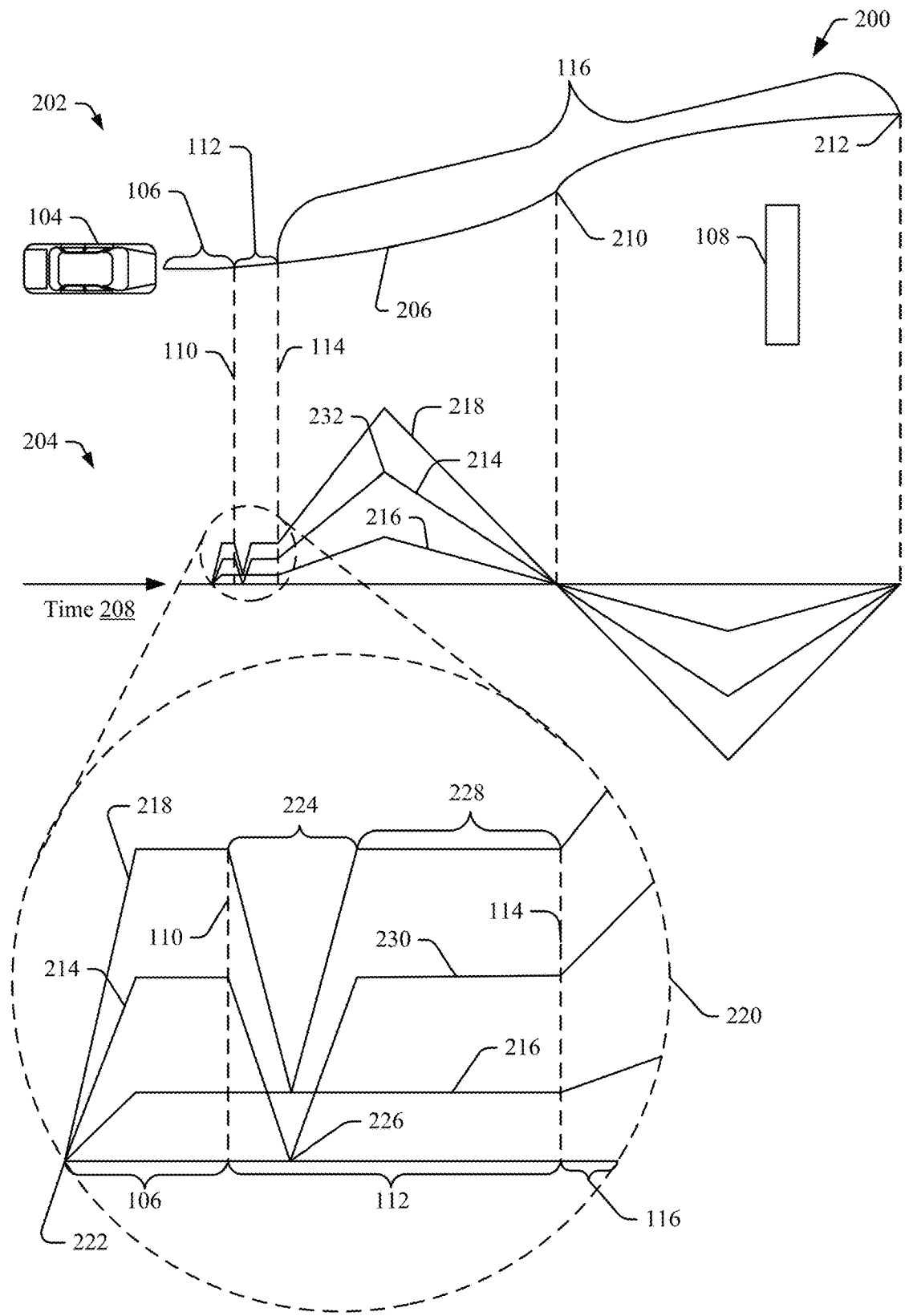
FIG. 2 illustrates an example illustration a trajectory and steering forces of a vehicle during ESA with a pre-active phase.

FIG. 2 is an example illustration 200 of a trajectory and steering forces of a vehicle using ESA with the pre-active phase 112. The example illustration 200 follows the example process flow 100 and comprises two parts: a trajectory portion 202 and a steering force portion 204. The trajectory portion 202 shows a trajectory 206 of the vehicle 104 in avoiding the object 108. The steering force portion 204 shows steering forces that affect the trajectory 206. The trajectory portion 202 and the steering force portion 204 share a time axis (e.g., time 208) in order to show a correlation between the steering forces the trajectory 206. The trajectory portion 202 has a coordinate system of up the page as the vehicle 104 steering left and down the page as the vehicle 104 steering right. Similarly, the steering force portion 204 has a coordinate system of up the page or positive as being a steering force to steer the vehicle 104 left and down the page or negative as being a steering force to steer the vehicle 104 to the right.

The inactive phase 106, the pre-active phase 112, and the active phase 116 are indicated in relation to the time 208. In between the phases are times corresponding to the prediction 110 and the determination 114. An inflection point 210 where the ESA system 102 (not shown) will reverse a steering force to steer the vehicle 104 back to an original direction (e.g., a swerve) is also indicated with its corresponding time. A final point 212, where the vehicle 104 is generally traveling in the same direction as when it started the process, albeit offset from the object 108, is also indicated with its corresponding time. The shape of the trajectory 206 may vary depending on implementation and circumstances. For example, the ESA system 102 may be configured to turn but not swerve (e.g., the trajectory 206 would be a straight-line tangent at the inflection point 210).

The steering force portion 204 shows an ESA steering force 214, a driver steering force 216, and a total steering force 218. The ESA steering force 214 is the difference between the total steering force 218 and the driver steering force 216. It should be noted that the driver steering force 216 may be zero for any portion or all of the time frame of the process without departing from the scope of this disclosure.

A portion of the steering force portion 204 is enlarged at 220. As shown, the driver steering force 216 is initiated at initial point 222. For example, the driver may see the object 108 and begin to turn the steering wheel, thus providing the driver steering force 216. The ESA steering force 214 in the inactive phase 106 corresponds to a standard power-steering force. Although the ESA steering force 214 is shown as a flat line entering the prediction 110, the ESA steering force 214 could be any shape in the inactive phase 106 without departing from the scope of the disclosure.

The prediction 110 is determined, and the ESA system 102 enters the pre-active phase 112. A first pre-active sub-phase 224 causes the ESA steering force 214 to be set to a low value at drop 226. The drop 226 may correspond to an ESA steering force of zero. Because there is a driver steering force 216 at a time corresponding to the drop 226, the total steering force 218 becomes the driver steering force 216 at the drop 226.

The driver steering force 216 is shown as non-zero at the time of the prediction 110 in order to show the drop 226 in the ESA steering force 214. If no driver steering force 216 is present at the time of the prediction 110, then the ESA steering force 214 would be zero at the time of the prediction (based on the standard power steering force of the inactive mode 106), and, thus, the total steering force 218 would be zero when the prediction 110 occurs. In this scenario, the drop 226 would disappear as the ESA system 102 would set the ESA steering force 214 to the low value of the drop 226, thereby taking the ESA steering force 214 from zero to zero.

After the drop 226, a second pre-active sub-phase 228 causes the ESA steering force 214 to rise to a pre-active steering force 230. The pre-active steering force 230 corresponds to a steering force at or slightly above the ESA steering force 214 provided during the inactive phase 106. If the pre-active steering force 230 is elevated relative to the inactive phase 106, the additional ESA steering force 214 may correspond to 1-2 Nm at a steering wheel of the vehicle. The torque applied by the ESA system 102 at the steering wheel is unlikely to be noticed by a driver. In some implementations, the second pre-active sub-phase 228 may not occur due to the determination 114 being made during the first pre-active sub-phase. In this case, the ESA system 102 would simply transition to the active phase 116 during the first pre-active sub-phase 224.

When the determination 114 is made, the ESA system 102 enters the active phase 116. The active phase 116 causes the ESA steering force 214 to climb to an active steering force 232 that will cause the vehicle to avoid the object 108. Once the object 108 has been avoided, the ESA system 102 may return to the inactive phase 106 (e.g., be deactivated until another prediction 110 is made).

By enabling the pre-active phase 112, the ESA system 102 is able to immediately begin climbing to the active steering force 232 when the determination 114 is made. It should be noted that the shapes of the trajectory 206 and the steering forces (214, 216, and 218) are shown for example only. The shapes, magnitudes, and time frames may vary widely based on situation and implementation without departing from the scope of this disclosure. Regardless of the shapes, the three phases and their transitions still occur.

Example Data Flows

Figure 3:
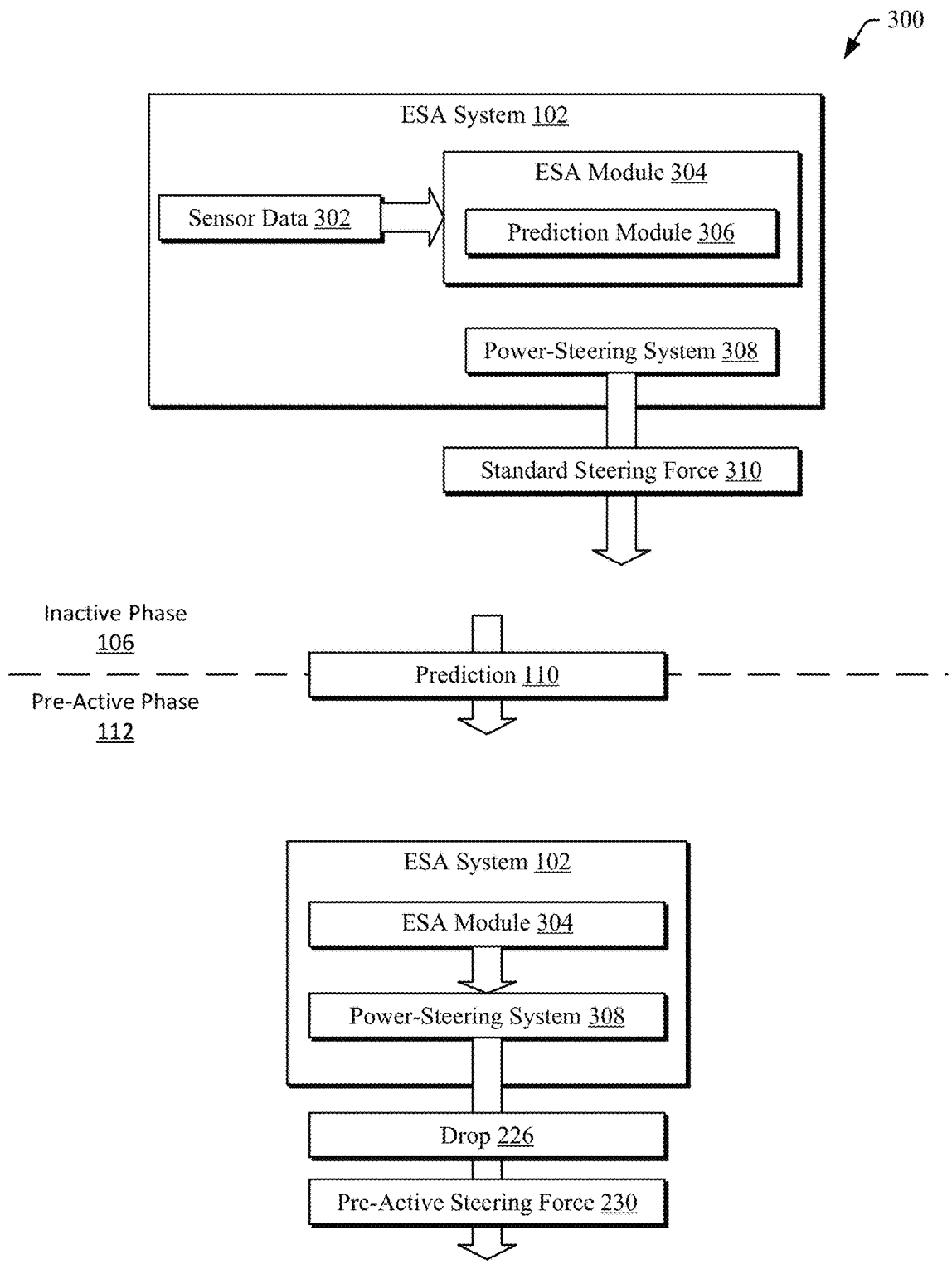
FIG. 3 illustrates example data flows of inactive and pre-active phases of ESA and a transition therebetween.

FIG. 3 is an example illustration 300 of example data flows and actions during the inactive phase 106, the pre-active phase 112, and the transition therebetween. The example illustration 300 starts with the ESA system 102 in the inactive phase 106. While in the inactive phase 106, sensor data 302 is received by an ESA module 304. The sensor data 302 may comprise data from local sensors that indicate a state of the vehicle 104 or an environment around the vehicle 104. The sensor data 302 may be received by a prediction module 306 that monitors the sensor data 302 to determine if the prediction 110 should be made.

In the inactive phase 106, the ESA module 304 may not provide any inputs to a power-steering system 308 of the vehicle 104. That is, while the ESA system 102 is in the inactive phase 106, the power-steering system 308 operates as it normally would, for example, by providing a standard steering force 310.

The prediction module 306 makes the prediction 110 that the collision with the object 108 is imminent. Based on making the prediction 110, the ESA system 102 transitions to the pre-active phase 112.

While in the pre-active phase 112, the ESA module 304 communicates with the power-steering system 308. The communication causes the power-steering system 308 to provide the drop 226 in the ESA steering force 214 and the pre-active steering force 230.

Figure 4:
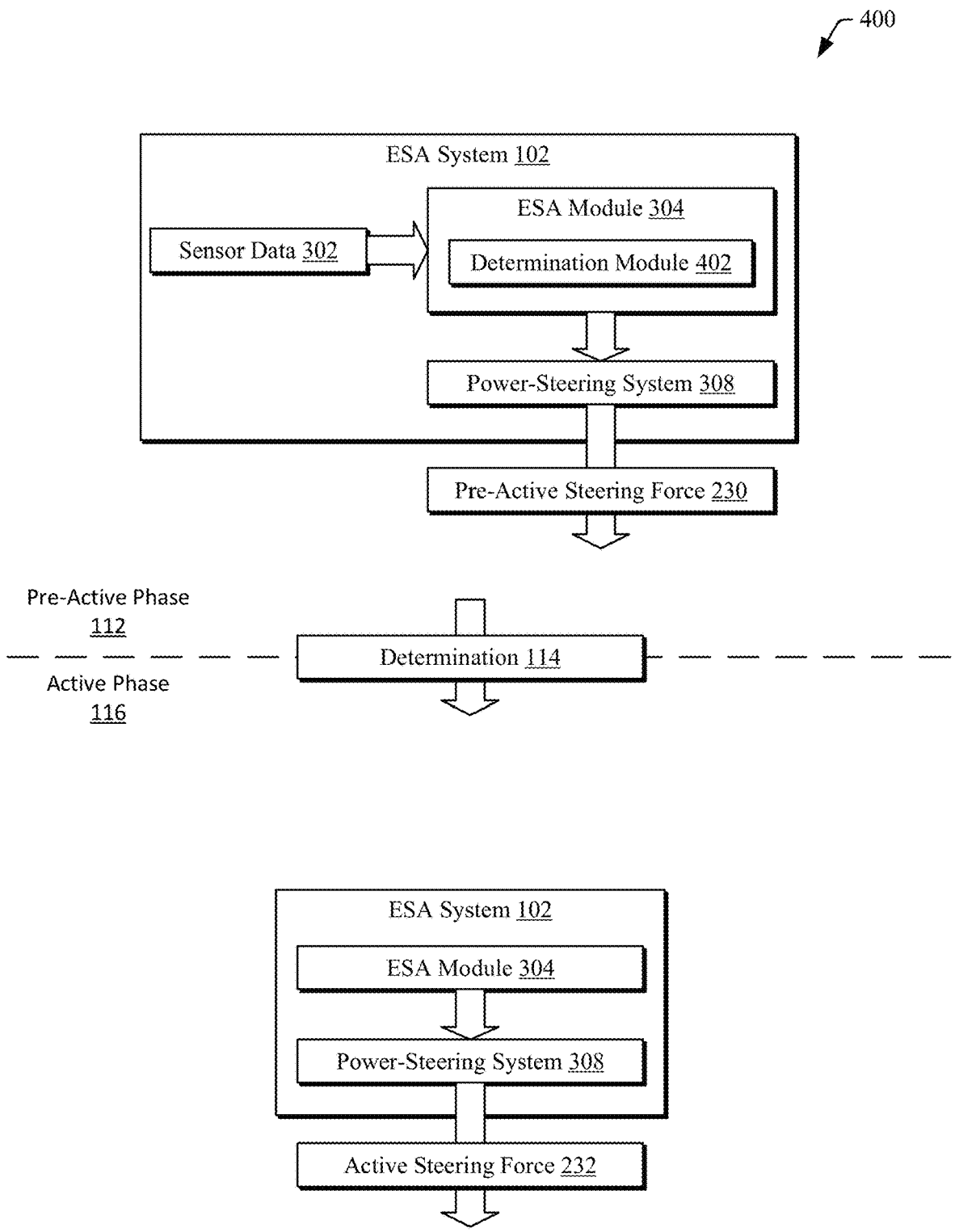
FIG. 4 illustrates example data flows of pre-active and active phases of ESA and a transition therebetween.

FIG. 4 is an example illustration 400 of example data flows and actions during the pre-active phase 112, the active phase 116, and the transition therebetween. The illustration 400 starts with the ESA system 102 in the pre-active phase 112. While in the pre-active phase 112, the sensor data 302 is received by the ESA module 304. The sensor data 302 may be received by a determination module 402 that monitors the sensor data 302 to determine if the determination 114 should be made.

Based on the sensor data 302, the determination module 402 makes the determination 114 that the collision with the object 108 is imminent. Although shown as outputting the pre-active steering force 230, as discussed above, the determination may be made prior to getting to the pre-active steering force, for example, during the first pre-active sub-phase 224. Based on making the determination 114, the ESA system 102 transitions to the active phase 116.

In some scenarios, the determination 114 may not be made. For example, while in the pre-active phase 112, the driver may steer enough to avoid the object 108, and thus, never trigger the determination. In this case, the ESA system 102 may return to the inactive phase 106. Because the pre-active phase 112 is barely noticeable by the driver, entering and exiting the pre-active phase 112 without transitioning to the active phase 116 is minorly disrupting to a driver, if at all.

While in the active phase 116, the ESA module 304 communicates with the power-steering system 308. The communication causes the power-steering system 308 to provide the active steering force 232, which is effective to avoid the collision with the object 108.

Example Device

Figure 5:
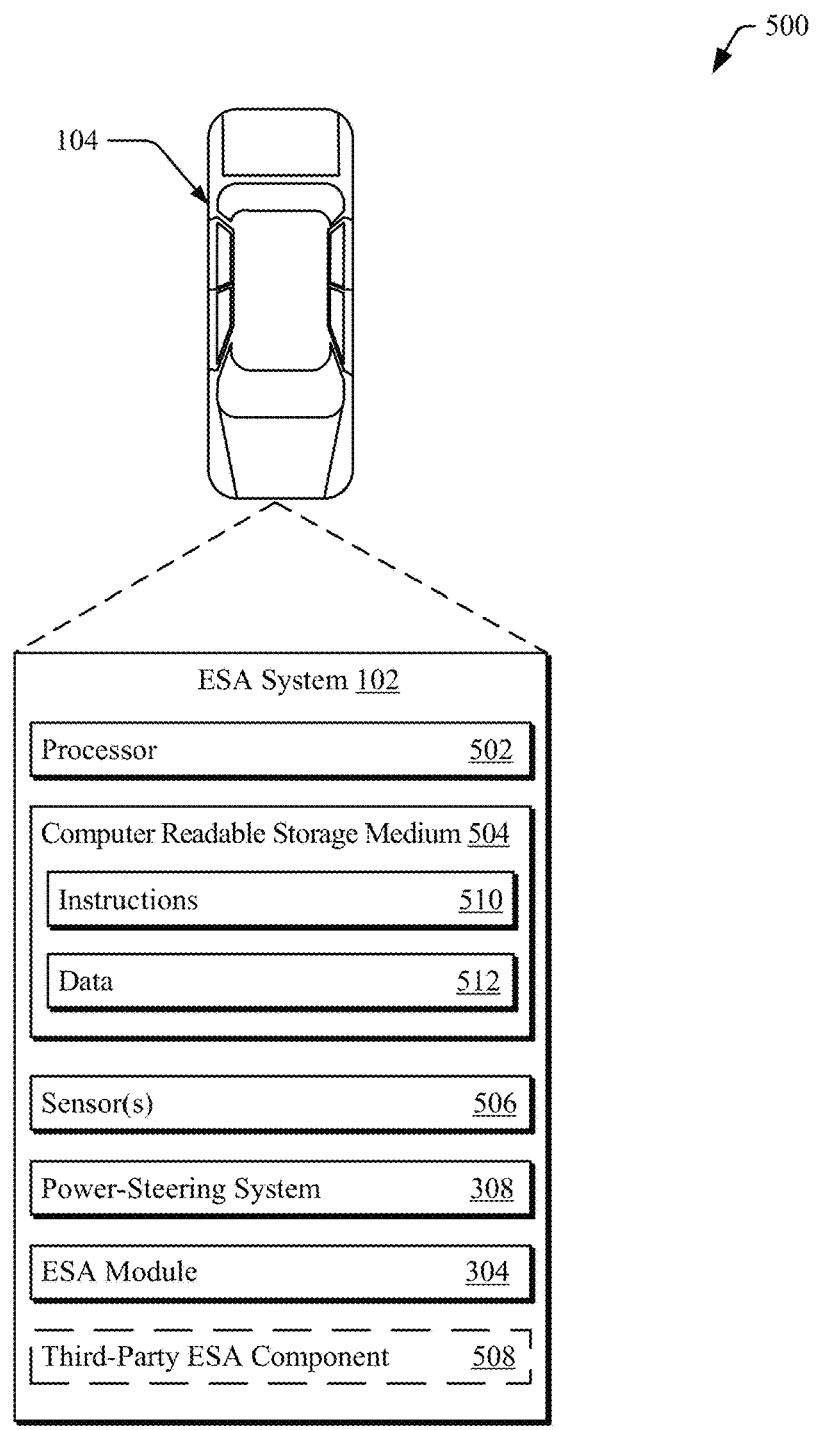
FIG. 5 illustrates an example ESA system configured to perform ESA with a pre-active phase.

FIG. 5 illustrates, at 500, an example of the ESA system 102 in which ESA with the pre-active phase 112 can be implemented. Although the vehicle 104 is illustrated as a car, the vehicle 104 may comprise any vehicle (e.g., a truck, a bus, a boat, a plane, etc.) without departing from the scope of this disclosure. As shown underneath, the ESA system 102 of the vehicle 104 includes at least one processor 502, at least one computer-readable storage medium 504, one or more sensors 506, the power-steering system 308, the ESA module 304, and optionally a third-party ESA component 508.

The processor 502 (e.g., an application processor, microprocessor, digital-signal processor (DSP), or controller) executes instructions 510 (e.g., code) stored within the computer-readable storage medium 504 (e.g., a non-transitory storage devices such as a hard drive, SSD, flash memory, read-only memory (ROM), EPROM, or EEPROM) to cause the ESA system 102 to perform the techniques described herein. The instructions 510 may be part of an operating system and/or one or more applications of the ESA system 102.

The instructions 510 cause the ESA system 102 to act upon (e.g., create, receive, modify, delete, transmit, or display) data 512 (e.g., application data, module data; sensor data, or I/O data). Although shown as being within the computer-readable storage medium 504, portions of the data 512 may be within a random-access memory (RAM) or a cache of the ESA system 102 (not shown). Furthermore, the instructions 510 and/or the data 512 may be remote to the ESA system 102.

The ESA module 304 (or portions thereof) may be comprised by the computer-readable storage medium 504 or be a stand-alone component (e.g., executed in dedicated hardware in communication with the processor 502 and computer-readable storage medium 504). For example, the instructions 510 may cause the processor 502 to implement or otherwise cause the ESA module 304 to receive the sensor data 302 and transition between the phases, as described in regard to FIGS. 1-4.

The sensors 506, which provide the sensor data 302, may be any type of sensors, detectors, or code. For example, the sensors 506 may comprise a ranging sensor to detect a range and/or location of the object 108. The sensors 506 may also comprise a potentiometer on a steering column of the vehicle to determine a steering input or rapid input by the driver. Furthermore, the sensors 506 may comprise code that determines if functions or components of the vehicle are active, e.g., the FCW being activated or not.

The power-steering system 308 may be any type of system known by those of ordinary skill in the art. For example, the power-steering system may be hydraulic or electric, with column, rack, or steering-box-mounted actuators. Regardless of implementation, the power-steering system 308 provides steering forces to the vehicle, which may be driver-initiated or initiated by the ESA module 304.

The optional third-party ESA component 508 is representative of an original equipment manufacturer (OEM) or third-party ESA component (e.g., hardware, software, system, or function). For example, the ESA module 304 may interface with the third-party ESA component 508 to cause the power-steering system 308 to apply the ESA steering force 214. For example, the ESA module 304 may make the prediction 110 and cause the third-party ESA component 508 to activate. By doing so, the ESA module 304 may cause the third-party ESA component 508 to initiate the drop 226 and the pre-active steering force 230. Similarly, the third-party ESA component 508 may make the determination and initiate the active steering force 232. Without the ESA module 304 communicating with the third-party ESA component 508, the third-party ESA component 508 would wait until the determination 114 to activate, thus causing the drop 226 to occur after the determination 114, which, as discussed above, is not optimal.

Example Method

Figure 6:
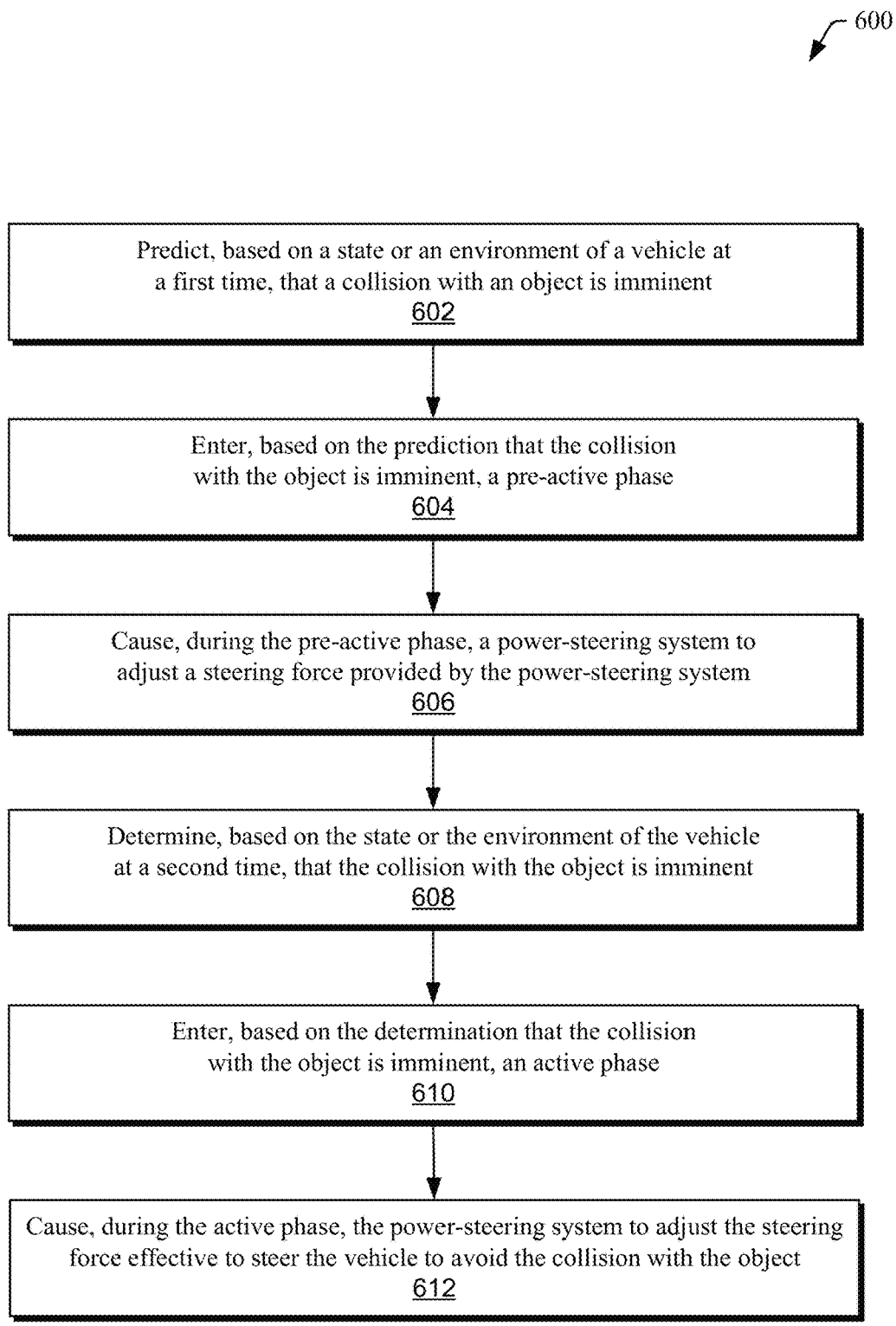
FIG. 6 illustrates an example method of ESA with a pre-active phase.

FIG. 6 illustrates an example method 600 for ESA with the pre-active phase 112. Method 600 may be implemented utilizing the previously described examples, such as the process flow 100, the illustrations 200, 300, and 400, and the ESA system 102. Operations 602 through 612 may be performed by one or more entities (e.g., the ESA system 102, the ESA module 304, or the third-party ESA component 508). The order in which the operations are shown and/or described is not intended to be construed as a limitation, and any number or combination of the operations can be combined in any order to implement the method 600 or an alternate method.

The method 600 generally starts in an inactive state (e.g., the inactive state 106). At 602, a state or an environment of a vehicle at a first time is determined, and a prediction is made that a collision with an object is imminent. For example, the ESA module 304 may receive the sensor data 302 and make the prediction 110.

At 604, a pre-active phase is entered based on the prediction that the collision with the object is imminent. For example, the ESA module 304 may cause the ESA system 102 to enter the pre-active phase 112. In some implementations, the third-party ESA component 508 may be activated (but not tasked to provide evasive steering).

At 606, a steering force provided by a power-steering system is adjusted. For example, the ESA module 304 may cause the power-steering system 308 to output the drop 226 in the ESA steering force 214 and the pre-active steering force 230. In some implementations, the drop 226 and the pre-active steering force 130 are implemented via the third-party ESA component 508.

At 608, the state or the environment of the vehicle at a second time is determined, and a determination is made that the collision with the object is imminent. For example, the ESA module 304 or the third-party ESA component 508 may receive the sensor data 302 and make the determination 114.

At 610, an active phase is entered based on the determination that the collision with the object is imminent. For example, the ESA module 304 may cause the ESA system 102 to enter the active phase 116. In some implementations, the active phase 116 enables the third-party ESA component 508 to provide evasive steering.

At 612, the steering force provided by the power-steering system is adjusted effective to steer the vehicle to avoid the collision with the object. For example, the ESA module 304 may cause the power-steering system 308 to output the active steering force 232. Alternatively, the third-party ESA component 508 may cause the power-steering system 308 to output the active steering force 232.

Although implementations of ESA with a pre-active phase have been described in language specific to certain features and/or methods, the subject of the appended claims is not necessarily limited to the specific features or methods described. Rather, the specific features and methods are disclosed as example implementations for ESA with a pre-active phase. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
   determining, by at least one processor of a vehicle and at an initial time, that a forward collision warning (FCW) of the vehicle has been triggered based on a potential collision with an object;
   responsive to determining that the FCW has been triggered, causing the vehicle to enter a pre-active phase where an assist steering force provided by a power-steering system of the vehicle is adjusted to zero;
   determining, by the processor and at a subsequent time, that an evasive steering assist (ESA) has been triggered based on the potential collision with the object; and
   responsive to determining that the ESA has been triggered, causing the vehicle to enter an active phase where the assist steering force is adjusted further than the pre-active phase to steer the vehicle and prevent the potential collision with the object.

2. The method of claim 1, wherein:
   the pre-active phase comprises a first pre-active sub-phase and a second pre-active sub-phase;
   the assist steering force is adjusted to zero during the first pre-active sub-phase; and
   the assist steering force is adjusted to be similar to that of an inactive phase during the second pre-active sub-phase.

3. The method of claim 1, wherein:
   the pre-active phase comprises a first pre-active sub-phase and a second pre-active sub-phase;
   the assist steering force is adjusted to zero during the first pre-active sub-phase; and
   the assist steering force is adjusted to be higher than that of an inactive phase during the second pre-active sub-phase.

4. The method of claim 3, wherein a difference between the assist steering force of the second pre-active sub-phase and that of the inactive phase corresponds to less than five Newton-meters (Nm) at a steering wheel of the vehicle.

5. The method of claim 1, wherein causing the vehicle to enter the pre-active phase comprises activating an ESA component of the vehicle.

6. The method of claim 5, wherein at least one of triggering the ESA or causing the vehicle to enter the active phase are performed via the ESA component.

7. The method of claim 6, wherein the ESA component requires that the assist steering force drop to zero.

8. The method of claim 1, wherein causing the vehicle to enter the pre-active phase is further responsive to determining a rapid steering action performed by a driver of the vehicle.

9. A system comprising at least one processor configured to:
- determine, at an initial time, that a forward collision warning (FCW) of a vehicle has been triggered based on a potential collision with an object;
- responsive to the determination that the FCW has been triggered, cause the vehicle to enter a pre-active phase where an assist steering force provided by a power-steering system of the vehicle is adjusted to zero;
- determine, at a subsequent time, that an evasive steering assist (ESA) has been triggered based on the potential collision with the object; and
- responsive to the determination that the ESA has been triggered, cause the vehicle to enter an active phase where the assist steering force is adjusted further than the pre-active phase to steer the vehicle and prevent the potential collision with the object.

10. The system of claim 9, wherein:
- the pre-active phase comprises a first pre-active sub-phase and a second pre-active sub-phase;
- the assist steering force is adjusted to zero during the first pre-active sub-phase; and
- the assist steering force is adjusted to be similar to that of an inactive phase during the second pre-active sub-phase.

11. The system of claim 9, wherein:
- the pre-active phase comprises a first pre-active sub-phase and a second pre-active sub-phase;
- the assist steering force is adjusted to zero during the first pre-active sub-phase; and
- the assist steering force is adjusted to be higher than that of an inactive phase during the second pre-active sub-phase.

12. The system of claim 11, wherein a difference between the assist steering force of the second pre-active sub-phase and that of the inactive phase corresponds to less than five Newton-meters (Nm) at a steering wheel of the vehicle.

13. The system of claim 9, wherein the causing the vehicle to enter the pre-active phase is further responsive to determining a rapid steering action performed by a driver of the vehicle.

14. The system of claim 9, wherein causing the vehicle to enter the pre-active phase comprises activating an ESA component of the vehicle.

15. The system of claim 14, wherein at least one of triggering the ESA or causing the vehicle to enter the active phase are performed via the ESA component.

16. The system of claim 15, further comprising the ESA component.

17. The system of claim 16, wherein the ESA component is configured to require the drop of the steering force to zero.

18. Computer-readable storage media comprising instructions that, when executed, cause one or more processors to:
- determine, at an initial time, that a forward collision warning (FCW) of a vehicle has been triggered based on a potential collision with an object;
- responsive to the determination that the FCW has been triggered, cause the vehicle to enter a pre-active phase where an assist steering force provided by a power-steering system of the vehicle is adjusted to zero;
- determine, at a subsequent time, that an evasive steering assist (ESA) has been triggered based on the potential collision with the object; and
- responsive to the determination that the ESA has been triggered, cause the vehicle to enter an active phase where the assist steering force is adjusted further than the pre-active phase to steer the vehicle and prevent the potential collision with the object.

19. The computer-readable storage media of claim 18, wherein:
- the pre-active phase comprises a first pre-active sub-phase and a second pre-active sub-phase;
- the assist steering force is adjusted to zero during the first pre-active sub-phase; and
- the assist steering force is adjusted to be similar to or higher than that of an inactive phase during the second pre-active sub-phase.

20. The computer-readable storage media of claim 18, wherein:
- causing the vehicle to enter the pre-active phase comprises activating an ESA component of the vehicle; and
- at least one of triggering the ESA or causing the vehicle to enter the active phase are performed via the ESA component.

* * * * *